UNITED STATES PATENT OFFICE.

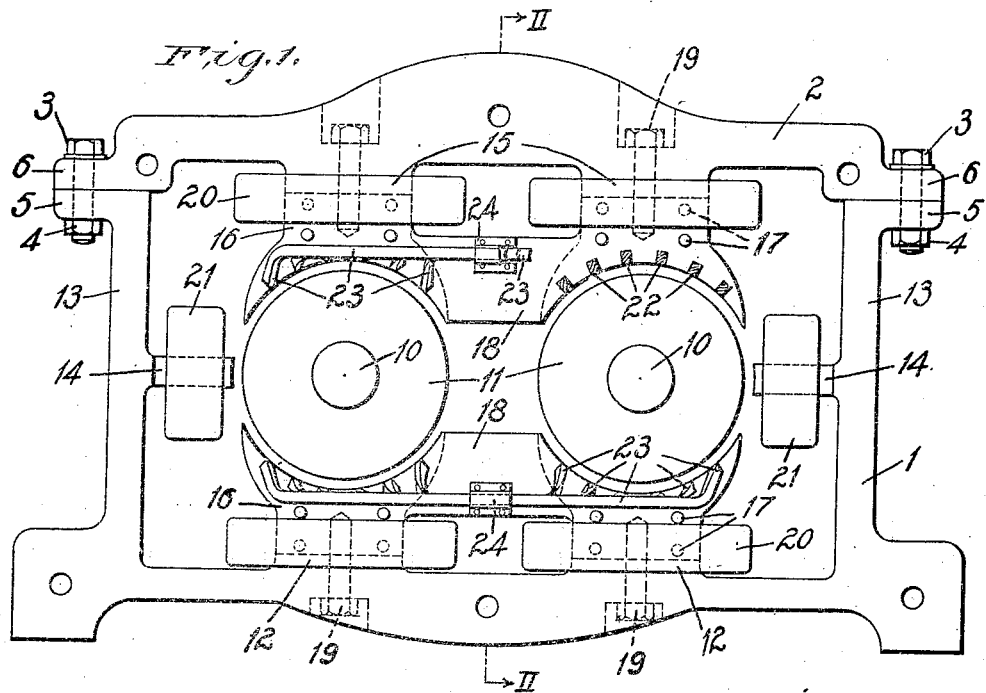

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,291,232.   Specification of Letters Patent.   Patented Jan. 14, 1919.

Application filed August 9, 1915. Serial No. 44,420.

*To all whom it may concern:*

Be it known that I, NORMAN W. STORER, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to machines provided with a plurality of armature members such as, for example, high-voltage direct-current generators in which the armature windings generate substantially equal portions of the total voltage of the machine.

The most suitable design for a generator of the above mentioned type is to have the armatures in the same horizontal plane, the driving power being supplied by a prime mover located centrally with respect to the armatures, through suitable gearing. Large generators of this type are also usually provided with compensating windings carried by the field-magnet pole pieces in order to neutralize the armature reaction.

By my invention, I provide a construction for multiple-armature generators in which the field-magnet yoke is divided, the several parts of the yoke being provided with suitable pole pieces and with compensating windings associated therewith which serve, in common, for a plurality of armatures.

In the accompanying drawings, Figure 1 is a view, in end elevation, of a machine constructed in accordance with my invention, the end brackets being removed, and Fig. 2 is a sectional view on the line II—II of Fig. 1.

A field-magnet yoke structure is divided into two sections 1 and 2 which are secured together by suitable means, such as bolts 3 and nuts 4 in coöperative relation with lug portions 5 and 6 provided on the sections 1 and 2, respectively. End brackets 7, that are removably mounted on the field-magnet yoke structure by means of bolts 8, are severally provided with symmetrically disposed bearing housings 9 which support shafts 10 and armature members 11 in side-by-side relation. The lower section 1 of the field-magnet yoke is provided with pole seats 12 symmetrically disposed with respect to the armature members 11, and the upwardly-extending side portions 13 of the yoke section 1 are provided with oppositely disposed interpolar projections 14 which lie in substantially the horizontal plane of the shafts 10. The upper field-magnet yoke section 2 is provided with pole seats 15 which are in alinement with the corresponding pole seats 12 on the yoke section 1 when the two sections of the field-magnet yoke are secured together, as described above. Field-magnet pole pieces 16, composed of suitable laminations in the usual manner, are secured together in pairs between suitable end plates 18, preferably of non-magnetic material, by means of rivets 17. The pole pieces 16 are spaced apart by the end plates 18 so that their central axes will coincide with the center lines of the pole seats 12 and 15, and similar pairs of pole pieces are secured to the upper and lower yoke sections 1 and 2 by means of bolts 19. Field-magnet windings 20 and 21 are disposed on the pole pieces 16 and the interpolar projections 14, respectively. The faces of the pole pieces 16 are provided with slots 22 within which compensating windings 23 are concentrically arranged on separate pairs of pole pieces 16, each compensating winding thus serving, in common, for both of the armature members 11. The compensating windings 23 are rigidly supported between adjacent pole pieces 16 by means of suitable cleats 24 which are carried by the non-magnetic end plates 18.

From the foregoing, it is apparent that the upper and lower sections of the field-magnet yoke are entirely separate and that the upper section 2, including the pole pieces 16 and one compensating winding 23, may be removed without disturbing the armature members 11. Furthermore, the pairs of pole pieces carrying the respective compensating windings may always be handled as separate units. It will also be apparent that the same arrangement of the compensating windings may be as readily applied to machines in which the pole pieces are integral with the yoke.

While I have shown my invention in a simple and preferred form, it is not so limited, but is susceptible of various modifications within the scope of the appended claims.

I claim as my invention:

1. A dynamo-electric machine comprising a plurality of armatures, a field-magnet yoke surrounding said armatures and provided with a plurality of pairs of oppositely disposed main and interpolar projections, and compensating windings located on adjacent main pole projections, the said yoke being divided in a plane displaced from the longitudinal axis of said interpolar projections.

2. In a dynamo-electric machine, the combination with a plurality of armatures and a divided field-magnet yoke surrounding said armatures, of compensating windings carried by each part of said yoke and serving, in common, for a plurality of armatures.

3. In a dynomo-electric machine, the combination with a plurality of armatures and a divided field-magnet yoke therefor, part of said yoke being provided with a plurality of pole pieces, of a compensating winding carried by the said pole pieces and serving, in common, for a plurality of armatures.

4. In a dynamo-electric machine, the combination with a plurality of armatures and field-magnet members therefor, of compensating windings respectively interlinked with a plurality of said field-magnet members and serving, in common, for a plurality of armatures.

5. In a dynamo-electric machine, the combination with a plurality of armatures and a divided field-magnet yoke therefor, of a plurality of pole pieces for each part of said yoke, the said pole pieces being joined together to form a unitary structure and serving, in common, for a plurality of armatures.

6. In a dynamo-electric machine, the combination with a plurality of armatures and a divided field-magnet yoke therefor, of a plurality of pole pieces for each part of said yoke, the said pole pieces being joined together to form a unitary structure and being provided with compensating windings to serve, in common, for a plurality of armatures.

7. In a dynamo-electric machine, the combination with a plurality of armatures and a divided field-magnet yoke therefor, of a plurality of pole pieces for each part of said yoke, the said pole pieces being joined together in pairs and being provided with compensating windings serving, in common, for a plurality of armatures.

In testimony whereof I have hereunto subscribed my name this 29th day of July, 1915.

NORMAN W. STORER.

Copies of this patent may be obtained for five cents each, by addressing the "Commissioner of Patents, Washington, D. C."